May 24, 1955  G. A. JUST  2,709,043
COMPUTING KEY FOR MERCHANDISE DISPENSING EQUIPMENT
Filed March 1, 1952  2 Sheets-Sheet 1
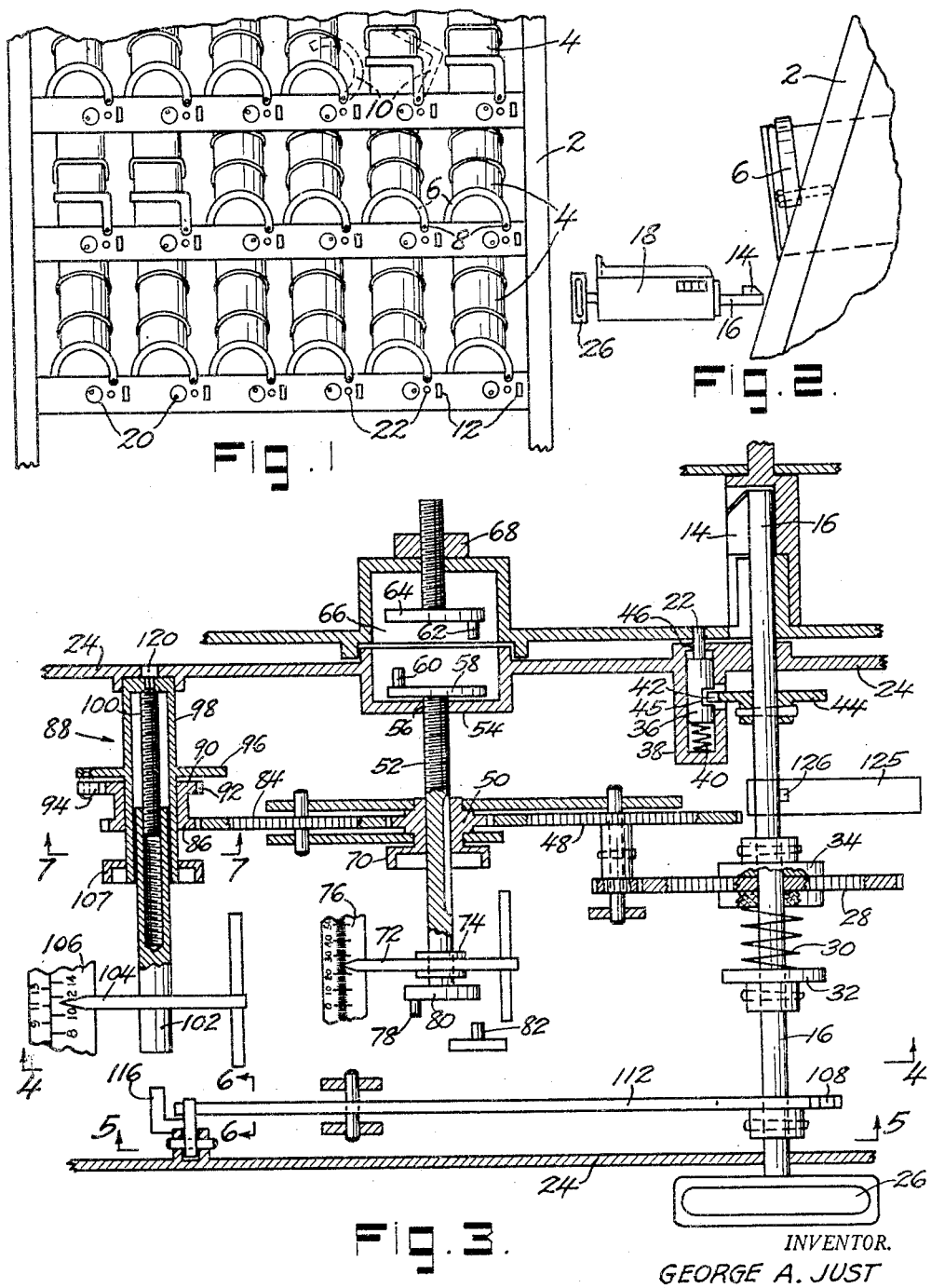
INVENTOR.
GEORGE A. JUST
BY Albert S Perry
ATTORNEY May 24, 1955    G. A. JUST    2,709,043
COMPUTING KEY FOR MERCHANDISE DISPENSING EQUIPMENT
Filed March 1, 1952    2 Sheets-Sheet 2

INVENTOR.
GEORGE A. JUST
BY Albert Sperry
ATTORNEY

United States Patent Office 2,709,043
Patented May 24, 1955

2,709,043

COMPUTING KEY FOR MERCHANDISE DISPENSING EQUIPMENT

George A. Just, Scarsdale, N. Y., assignor to The Grand Union Company, New York, N. Y., a corporation of Delaware Application March 1, 1952, Serial No. 274,376

5 Claims. (Cl. 235—91)

This invention relates to control means for merchandise dispensing equipment and is directed particularly to computing keys which serve to indicate the total cost or amount of the item of merchandise dispensed.

Self service merchandising equipment is frequently provided with means for locking or retaining the merchandise in place for removal only upon the insertion of a proper key or control device. However, when the price of the items of merchandise varies as it does in a grocery or drug store and elsewhere, it is desirable to provide a key or control device which serves to compute the total cost of the various items which may be selected and released from the equipment in making a series of purchases of differently priced items.

The computing keys heretofore provided for such purposes have been complicated and expensive in construction and have been capable of manipulation by the customer to give a false indication of the extent to which the key has been used. Moreover, such keys have not been capable of use in subtracting charges from a previous total such as a deposit made by the purchaser when receiving the key. There is also an inducement for customers to keep or conceal the key or to use an alternative key showing a smaller charge instead of returning the key with all charges recorded to the cashier.

In accordance with the present invention a novel type of computing key is provided which is relatively simple and inexpensive to produce and incapable of manipulation by the customer to give an incorrect computation. In a preferred form of the present invention the key is designed to be preset to a figure such as $5.00 or $10.00, for example, corresponding to a deposit made by the purchaser when receiving the key. Subsequent manipulation of the key to release merchandise from the dispensing equipment then serves to subtract the charge for the merchandise from the total and gives an indication of the amount remaining to be spent or to be received as change from the cashier when returning the key.

In this way the customers can keep accurate account of their purchases and the cashier is immediately apprised of the amount of change to be returned to the customer without employing an adding machine. Moreover, the customers will almost always require some change from their original deposit and will therefore be anxious to return the key and receive their change rather than carry the key away by accident or design.

One of the objects of the present invention is to provide a novel type of computing key for merchandise dispensing equipment which is simple and economical to produce and use.

Another object of the invention is to provide a method of controlling the dispensing of merchandise in which the customer is given an incentive to return the key to the cashier.

A further object of the invention is to provide a computing key which may be preset to a figure corresponding to a deposit and which is operable to subtract the amount of purchases made by manipulation of the key from such pre-set figure.

A specific object of the invention is to provide a computing key which gives an indication of the amount of a deposit remaining to be spent or to be received as change from a cashier on surrender of the key.

These and other objects and features of the invention will appear from the following description thereof in which reference is made to the figures of the accompanying drawings.

In the drawings:

Fig. 1 is a front elevation of a typical article dispensing device adapted for operation by means of a computing key embodying the present invention;

Fig. 2 is a side elevation of a portion of the equipment illustrated in Fig. 1 showing a preferred form of key embodying the present invention;

Fig. 3 is a diagrammatic plan view of the key illustrated in Fig. 2;

Figure 4:
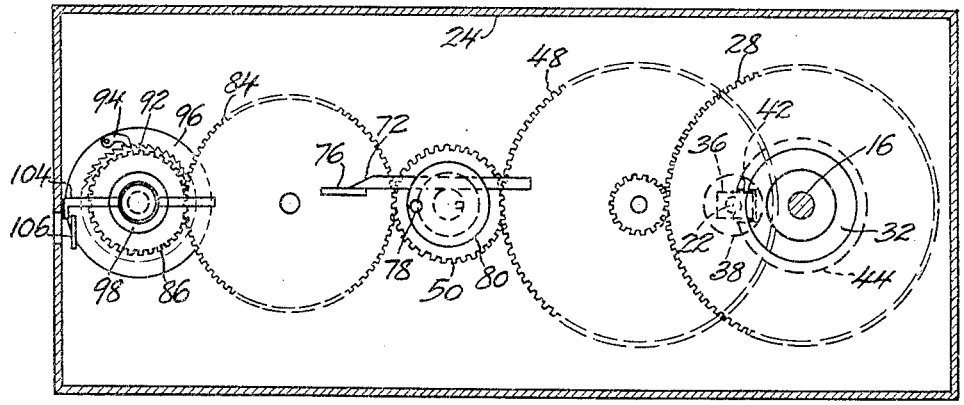
Figure 5:
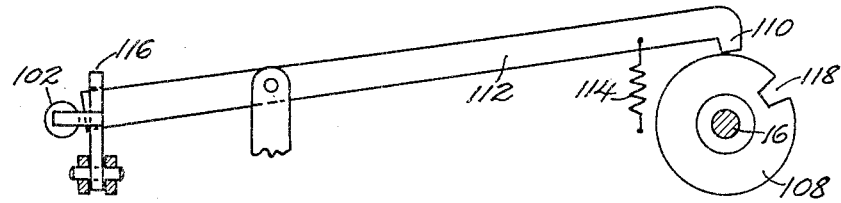
Figures 6, 7:

Fig. 4 is a vertical sectional view through the key shown in Fig. 3 taken on the line 4—4; and Figs. 5, 6 and 7 are detail views of elements of the key shown in Figs. 2, 3 and 4 taken on the section lines 5—5, 6—6 and 7—7 respectively, of Fig. 3.

In that form of the invention chosen for purposes of illustration in the drawings the dispensing equipment is shown to be in the form of a stand 2 upon which cans, boxes and other containers of merchandise 4 are arranged in inclined chutes which are accessible to customers at the front of the stand, the lowermost article in each chute being held in place by suitable means such as a retaining strap 6 pivotally mounted at 8 for movement to an article releasing position as shown in dotted lines at 10. Each chute and each retaining strap is provided with a lock having a keyhole 12 for receiving the keyed end 14 of an operating shaft 16 of a key 18 to release or actuate the retaining strap 6. Each chute is further provided with a price indexing member 20 and a key releasing stud 22 which are located adjacent the keyhole 12 and engageable by the key during manipulation thereof.

While a typical form of dispensing equipment is thus shown, the form and type of such equipment may be varied greatly depending upon the kinds of merchandise to be dispensed. The invention therefore is not intended to be limited with respect to the type of equipment used in any particular installation but may be altered or selected to meet any situation since the structure shown is merely diagrammatic and illustrative.

The key illustrated embodies a housing 24 within which the operating shaft 16 of the key is mounted. One end of shaft 16 projects from one end of the housing and is provided with a handle 26 while the other end of the shaft is keyed as indicated at 14 and projects from the other end of the housing, being formed for insertion into the keyhole 12 and for cooperation with the lock in the dispensing equipment. The operating shaft is rotatable in opposite directions and is provided within the housing with a main drive gear 28 that is frictionally secured to the shaft 16 for normal rotation therewith. Such frictional attachment is effected by the action of a spring 30 which has one end thereof bearing against a collar 32 fixed to the shaft and the other end of which bears against gear 28 and urges it against the driving collar 34 keyed to shaft 16. However, gear 28 may slip with respect to the shaft when the handle is rotated in either direction beyond the limits of movement of the gear fixed by limiting means hereafter described.

Shaft 16 is normally held against rotation when the key is not in use by means of a locking block 36 which is slidable in a sleeve 38 carried by the key housing and located adjacent the shaft 16. The locking block when projected under the action of spring 40 is positioned within a notch 42 in a collar 44 secured to shaft 16 and serves to lock the shaft against rotation. However, the locking block is retractable to bring a notch 45 therein into position opposite collar 40 to release the collar and shaft for rotation. Movement of the locking block to its releasing position is effected by the key releasing stud 22 on the dispensing equipment which enters the opening 46 in the housing to retract the locking block when the key operating shaft is inserted to the proper or full depth in keyhole 12 and the face of the key housing is pressed against the surface of the equipment adjacent the keyhole. The key therefore cannot be operated accidentally or even intentionally unless it has been properly positioned to effect the release of merchandise from the stand.

When the key has been properly inserted and the locking block is retracted, shaft 16 may be rotated by means of the handle 26. The drive gear 28 then rotates with the shaft and drives intermediate gearing 48 to rotate gear 50 which is splined to control screw 52. The latter screw is in threaded engagement with the recessed portion 54 of the key housing as indicated at 56. The outer end of the control screw 52 is provided with a head 58 having a stop pin 60 fixedly secured thereto for engagement with the stop pin 62 carried by the head 64 of the price setting member 20 located in a recess 66 adjacent the keyhole 12. The price setting member and its stop pin 62 are secured in a predetermined fixed position by a lock nut 68 or otherwise corresponding to the price of the article located in the chute or channel of the dispensing equipment with which it is associated. The control screw 52 is advanced by rotation of the handle 26 and gears 28, 48 and 50 until the stop pin 60 of the control screw is caused to engage the stop pin 62 on the price setting member. Such engagement will occur after a predetermined number of turns of the control screw corresponding to the price of the article. Further rotation of the handle 26 after the stop pins have engaged results in slippage of the drive gear 28 on shaft 16 since the gearing will be locked against rotation.

During rotation of the control screw a price indicating means may be actuated to show the price of the article through a suitable opening in the key housing if desired and for this purpose screw 52 may be provided with a tenths or cents indicator 70 and with a pointer 72 carried by the collar 74 and movable lengthwise with the screw over a price scale 76 reading in dimes and dollars. If desired, both the indicator 70 and the pointer 72 may be used and, of course, various other suitable forms of price indicators actuated by the control screws may be employed as preferred.

Rotation of the handle 26 of the key in one direction as described serves to actuate the lock and release the article to be purchased. However, rotation of the handle in the opposite direction is necessary to remove the key from the equipment and during such counter-rotation the gears 28, 48 and 50 serve to retract the control screw until it reaches a zero position determined by the positioning of a stop pin 78 on the head 80 secured to the inner end of the control screw and the stop pin 82 mounted on the inner face of the key housing. Continued counter-rotation of the handle results in slippage of the drive gear 28 on shaft 16 while the control screw remains in its zero position preparatory to a further operation of the key.

In order to compute the total of the various prices charged for different items released from the dispensing equipment in a series of purchases, the key is further provided with a computer driven by the gear 50 or other element rotating with the control screw 52. As shown gear 50 drives an idler gear 84 meshing with a gear 86 associated with a micrometer screw device 88. The gear 86 is formd with a collar 90 having ratchet teeth 92 thereon and engageable by a pawl 94 carried by a plate 96. The plate 96 is fixed to a tubular sleeve 98 through the center of which extends the micrometer screw 100 engaged by a complementary internally threaded totalizing pin 102 carrying a pointer 104 movable over the scale 106. If desired a numbered wheel 107 may be carried by the tubular sleeve 98 to indicate cents on each tenth of a rotation, in which case the latter scale may be graduated in terms of dollars and multiples of ten cents to indicate the total amount spent in making a series of purchases.

In using the key to make several purchases the totalizing pin is initially set at zero or preferably at a sum equal to a deposit made with the cashier when receiving the key, say ten dollars. Thereafter when the key in inserted in the keyhole 12 and stud 22 releases the operating shaft of the key, rotation of the handle and drive gear 28 acts through gears 48 and 50 and idler 84 to rotate gear 86. The ratchet teeth 92 on collar 90 are positioned to allow the pawl 74 to ride freely over the teeth without rotating the sleeve 98 or micrometer screw 100. However, when the key handle is given a counterrotation to free the key from the lock the gear train rotates in the opposite direction causing the ratchet teeth 92 to rotate the tubular sleeve of the computing device and to rotate the micrometer 100 so that pointer 104 is caused to move along the scale 106. The distance which the pointer moves is determined by the movement of the control screw 52 and it will continue to move until the stop pin 78 on the inner end of the control screw engages the stationary pin 82 on the key housing. The pointer 104 and scale 106 thus will record the amount of the initial purchases or subtract that amount from the figure originally shown as a deposit on the key. Subsequent purchases and operations of the key handle cause the totalizing pin 102 to be moved further in the same direction by distances corresponding to the prices of the other articles purchased. The pointer 104 is thus moved further along the scale with each purchase to compute the total amount of the purchases by addition or by subtraction from the deposit. The customer can therefore see at a glance how much has been spent or received as change from the cashier on return of the key.

In order to limit the purchases of the customer to the amount on deposit, the key may be provided with a latch to prevent excessive or unauthorized use of the key. As shown the key shaft 16 is provided with a locking plate 108 toward which the downwardly turned end 110 of a locking lever 112 is urged by a spring 114. The locking lever is held against movement by a latch 116 engageable by the end of the totalizing pin 102. Movement of the totalizing pin a predetermined distance corresponding to the total of the deposit will therefore retract the latch from the locking bar whereupon its downwardly turned end will enter the notch 118 in the locking plate and prevent further rotation of the key handle and shaft. In this way the locking bar serves as a positive purchase limiting means.

In order to prevent locking of the key during the course of any manipulation, the totalizing pin 102 preferably is positioned to actuate the latch 116 somewhat before the total on deposit has been expended. Thus, if the highest priced article in the merchandise dispensing equipment is $1.50, the locking lever 112 will be unlatched when the purchases total $8.50, but the end 110 of the lever will ride on the circular edge of locking plate 108 until the cycle has been completed and notch 118 has moved into position to receive the end 112. Thereafter, no new cycle can be started since it might exceed the amount on deposit with the cashier. Thus, the customer will, in most every case, receive a refund when the key is returned to the cashier and will not be able to initiate any operation which cannot be completed.

The setting of the micrometer computing means to a predetermined figure or to zero can be effected only by the cashier and for this purpose a specially shaped wrench-like key may be inserted into the opening 120 to rotate the tubular sleeve 98 and micrometer screw and pointer 104 to a desired position. At the same time the locking level 112 can be restored to its unlatched position by insertion of the special key through a suitable key opening (not shown) in the housing.

While the computing device described is in the form of a pointer and scale it will be evident that the totalizing pin can be caused to actuate any other form of registering means preferred to indicate the total amount of a series of purchases made by manipulation of the key any number of times. When the computing device is arranged to add the purchases, instead of subtracting them from a deposit, the locking bar and purchase limiting means operate to prevent excessive purchasing which might cause the tubular sleeve 98 to move so far in either direction as to result in jamming or disengagement of the tubular sleeve and micrometer screw.

The manner in which the present invention is employed will be evident from the foregoing description but a typical operation may be summarized as follows. A customer may make a deposit of, say ten dollars, with the cashier of the store and will receive in return a key which has been preset to show the amount of this deposit. The customer then goes to the dispensing equipment where the merchandise is stored on display and inserts the key into a keyhole. The handle 26 is then rotated to its limit of movement in one direction to release the merchandise retaining means and permit the article to be removed. The price of the article will then be indicated by the pointer 72 or other registering means actuated by the control screw 52. Thereafter, the handle 26 is rotated back to its initial position to permit removal of the key from the equipment. During such counter-rotation the micrometer computing means is actuated to deduct the price of the article purchased from the deposit and to actuate registering means such as the pointer 104 to show the amount remaining to be spent. When the prices of the items are added instead of being deducted from a deposit, the procedure is the same, the only difference being that of the initial position of the micrometer registering means and the direction of pitch of the threads on the micrometer screw and tubular sleeve.

Subsequent purchases are made in the same manner until the customer has made all of the purchases desired or the amount on deposit has been expended. The key and the articles purchased are then taken to the cashier who can see immediately how much change is to be returned from the deposit or, in case of adding, the amount to be paid by the customer. If desired, the key also may have an item counter to indicate the number of articles purchased or the number of times the key handle was actuated and for this purpose a conventional counter shown at 125 may be actuated by a lug 126 mounted on the shaft 16. Such a counter will serve as a check for both the customer and the cashier to determine whether the proper number of items are delivered to the customer making the purchases.

While the present invention has many uses and applications it is particularly applicable to self-service grocery stores. The device makes it unnecessary to mark the price of each article on the can or package since the price is fixed by the price indexing member 20 on the dispensing device and need only be changed infrequently when the price of the article being dispensed is changed or a different article is supplied to the equipment. Moreover, the cashier need only use a cash register since no adding or computing will be required of the cashier because it is all done automatically by the key mechanism.

The size, shape and details of the mechanism embodied in the key may be varied in many respects and the type of registering elements employed are capable of numerous variations. In view thereof it should be understood that the particular form of the invention shown in the drawings and described above is intended to be illustrative only and is not intended to limit the scope of the invention.

I claim:

1. A key for actuating merchandise dispensing equipment including means for releasing an article therefrom and price fixing means for causing said key to register the cost of the article released, said key comprising a handle for operating said key, gearing in said key operated by said handle on rotation thereof, a frictional connection between said gearing and handle permitting continued rotation of said handle when said gearing is held against movement, means actuated by said gearing engageable with said price fixing means on predetermined movement of the gearing to preclude further movement thereof, and registering means actuated by said gearing.

2. A key for actuating merchandise dispensing equipment including means for releasing an article therefrom and price fixing means for causing said key to register the cost of the article released, said key comprising a handle for operating said key, gearing in said key operated by said handle on rotation thereof, a frictional connection between said gearing and handle permitting continued rotation of said handle when said gearing is held against movement, means actuated by said gearing engageable with said price fixing means on predetermined movement of the gearing to preclude further movement thereof, registering means actuated by said gearing, and having a one-way driving connection therewith to permit operation of the register on rotation of the handle in one direction only.

3. A key for actuating merchandise dispensing equipment including means for releasing an article therefrom and price fixing means for causing said key to register the cost of the article released, said key comprising a handle for operating said key, gearing in said key operated by said handle on rotation thereof, a frictional connection between said gearing and handle permitting continued rotation of said handle when said gearing is held against movement, means actuated by said gearing engageable with said price fixing means on predetermined movement of the gearing to preclude further movement thereof, registering means actuated by said gearing, and means limiting movement of said registering means.

4. A key for actuating merchandise dispensing equipment including means for releasing an article therefrom and price fixing means for causing said key to register the cost of the article release, said key comprising a handle for operating said key, gearing in said key operated by said handle on rotation thereof, a frictional connection between said gearing and handle permitting continued rotation of said handle when said gearing is held against movement, means actuated by said gearing engageable with said price fixing means on predetermined movement of the gearing to preclude further movement thereof, registering means actuated by said gearing, and a purchase limiting member movable to prevent rotation of said handle upon predetermined movement of said registering means.

5. A key for actuating merchandise dispensing equipment including means for releasing an article therefrom and price fixing means for causing said key to register the cost of the article released, said key comprising a handle for operating said key, gearing in said key operated by said handle on rotation thereof, a frictional connection between said gearing and handle permitting continued rotation of said handle when said gearing is held against movement, means actuated by said gearing engageable with said price fixing means on predetermined movement of the gearing to preclude further movement thereof, registering means actuated by said gearing including a micrometer screw, means engaging said screw and movable to register the total amount of a series of purchases, a one-way driving connection between said registering means and shaft, and a purchase limiting member actuated by said register to prevent movement of said handle after predetermined movement of said registering means.

References Cited in the file of this patent

UNITED STATES PATENTS

| Number | Name | Date |
|---|---|---|
| 435,012 | Calkins | Aug. 26, 1890 |
| 802,077 | Hobbs | Oct. 17, 1905 |
| 1,404,280 | Dixon et al. | Jan. 24, 1922 |
| 1,454,108 | Dixon | May 8, 1923 |
| 1,825,281 | Parsons | Sept. 29, 1931 |
| 2,127,769 | Esgro | Aug. 23, 1938 |
| 2,313,424 | Esgro | Mar. 9, 1943 |
| 2,408,581 | Refkin | Oct. 1, 1946 |